INVENTOR.
HENRY J. FLAJOLE

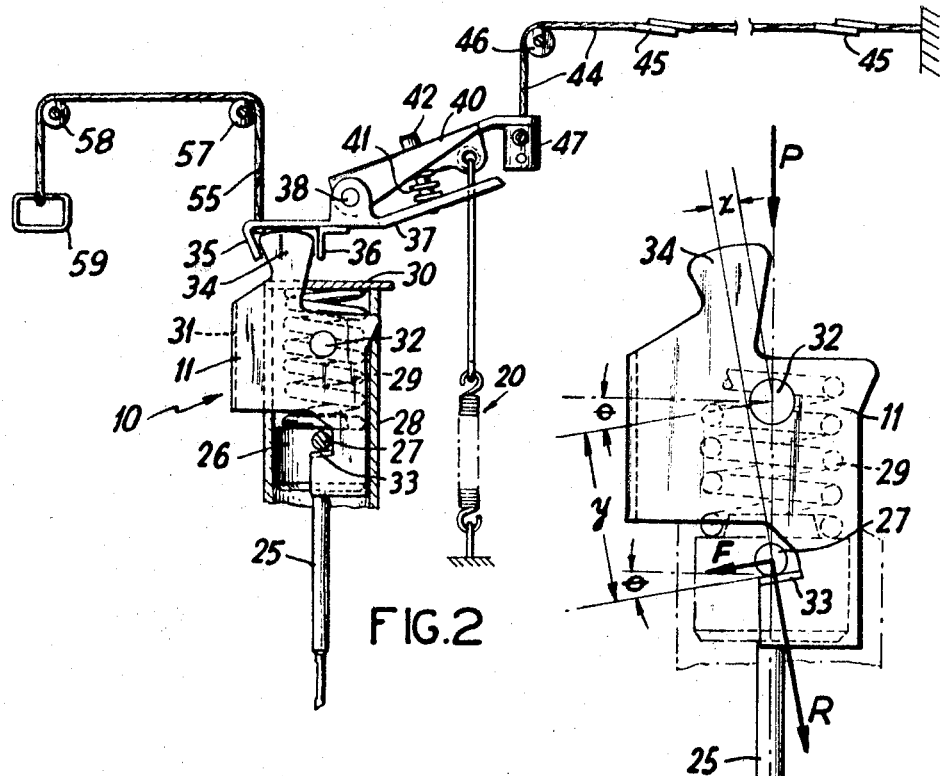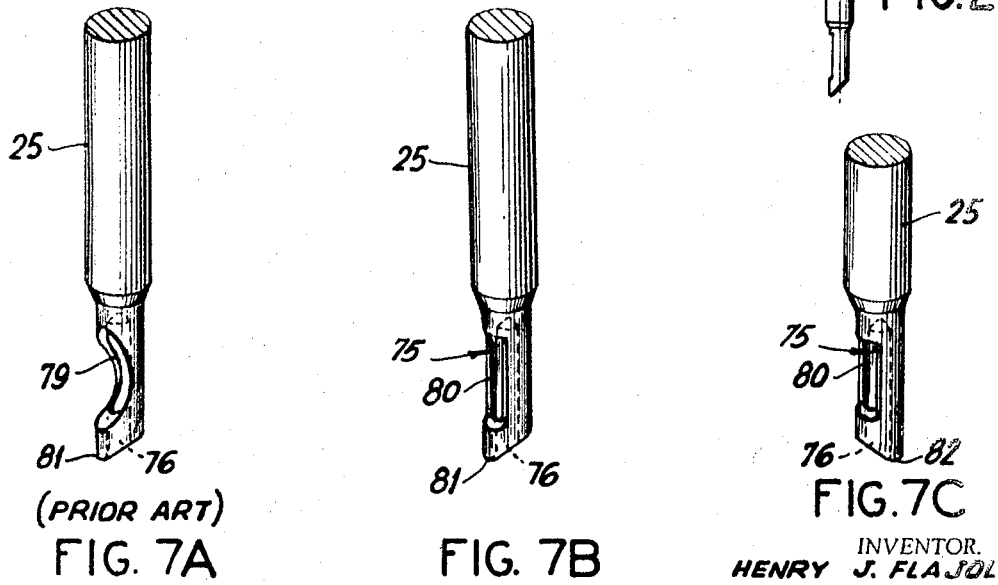

INVENTOR.
HENRY J. FLAJOLE
BY
Morgan, Finnegan, Durham & Pine
ATTORNEYS

Aug. 26, 1969

H. J. FLAJOLE 3,463,235

CONTROL UNIT FOR FIRE EXTINGUISHING SYSTEMS AND THE LIKE

Filed Dec. 5, 1967

INVENTOR.
HENRY J. FLAJOLE

BY
Morgan, Finnegan, Durham & Pine
ATTORNEYS

Aug. 26, 1969 H. J. FLAJOLE 3,463,235
CONTROL UNIT FOR FIRE EXTINGUISHING SYSTEMS AND THE LIKE
Filed Dec. 5, 1967 9 Sheets-Sheet 6
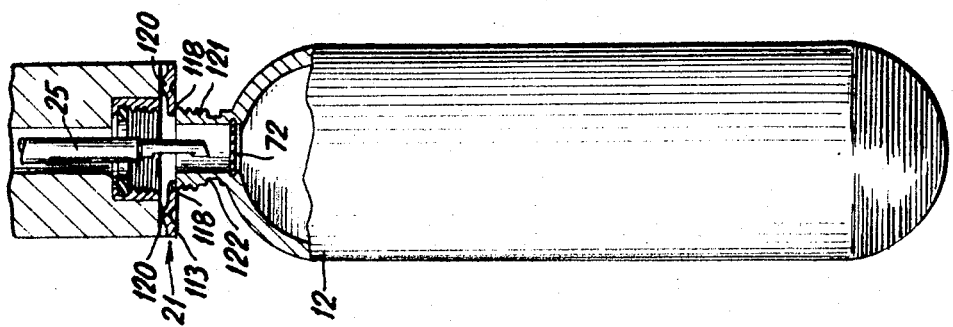
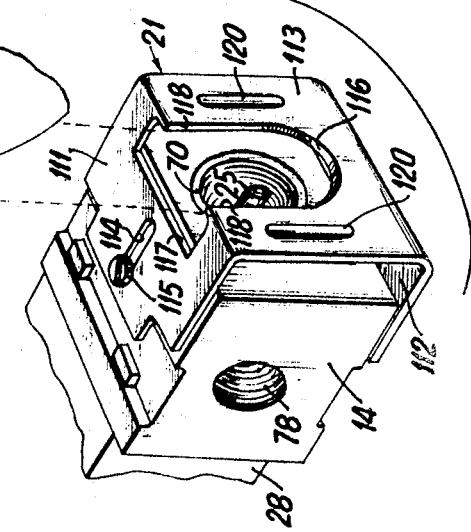
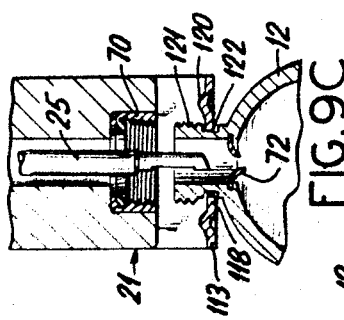
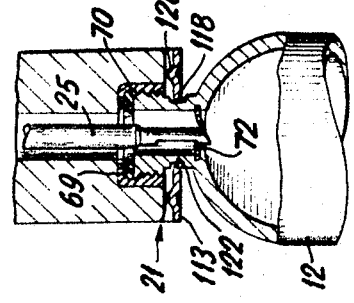
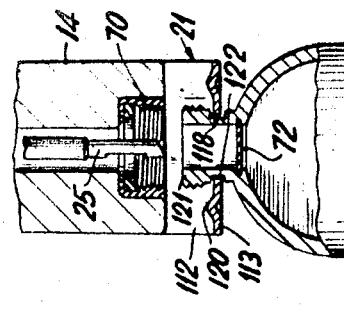
INVENTOR.
HENRY J. FLAJOLE
BY
Morgan, Finnegan, Durham & Pine
ATTORNEYS INVENTOR.
HENRY J. FLAJOLE
BY
Morgan, Finnegan, Durham & Pine
ATTORNEYS

United States Patent Office 3,463,235
Patented Aug. 26, 1969

3,463,235
CONTROL UNIT FOR FIRE EXTINGUISHING SYSTEMS AND THE LIKE
Henry J. Flajole, Menominee, Mich., assignor to The Ansul Company, Marinette, Wis., a corporation of Wisconsin
Filed Dec. 5, 1967, Ser. No. 688,231
Int. Cl. A62c *37/12, 37/18*
U.S. Cl. 169—9                                    19 Claims

ABSTRACT OF THE DISCLOSURE

A control unit for fire extinguishing systems and the like including a high-pressure cartridge which is punctured to in turn actuate the fire extinguishing system and perform auxiliary functions. The trip lever, which normally holds the puncture pin of the cartridge in a retracted position, is statically balanced, normally positively held in position, and positively driven when actuated. A safety preventer structure precludes accidental discharge of the cartridge, a removable cocking handle eliminates unauthorized use, and locking bar prevents accidental firing of the unit while being serviced.

---

This invention relates to control units for fire protection systems and the like.

A centralized control unit for a permanently installed fire or hazardous condition protection system must be highly versatile because of the variety of different types of sensing units that may be employed to actuate the system and because of the different types of extinguishing systems and auxiliary functions that must be controlled. The sensing units can include fusible links appropriately located to sense fires or abnormal temperatures, or may include infrared radiation detectors, or pressure change sensors for detecting shocks and explosions. The control unit should also be capable of manual actuation, either at the control unit or from a remote location. In addition, a plurality of control units should be capable of interconnection to operate in a master-slave relationship. The associated fire extinguishing system may be of the dry chemical type where a high-pressure discharge forces the extinguishing agent from a suitable tank enclosure, or may include a water-sprinkler system, a $CO_2$ system, a foam system, or a combination of different systems. The auxiliary functions include the closing of vents and fire doors, the shutting down of electrical equipment, the sounding of alarms, etc., and should be controlled in conjunction with actuation of the fire extinguishing system.

Not only must the control unit be versatile, but it must be rugged and highly reliable. In order to provide the necessary protection, the control unit must reliably actuate the fire extinguishing system even under adverse conditions which often accompany a fire or other disaster. The control unit must also be immune from normal vibration and shock, since unnecessary and costly damage can result should the fire extinguishing system be actuated in the absence of a fire or disaster. In addition, the control unit must be safe from the operator's standpoint and use by unauthorized personnel must be prevented.

Thus, an object of this invention is to provide a versatile control unit capable of use with substantially all known sensing units or actuating techniques.

Another object is to provide a versatile control unit capable of controlling substantially any known type of fire extinguishing system and capable of performing virtually any desired auxiliary function.

Another object is to provide a highly reliable control unit which is not adversely affected by vibration, or shock, and in which moving components are positively held in their normal positions and are driven to alternate positions when the unit is fired.

Still another object is to provide a control unit which can be safely handled by authorized personnel.

The manner in which the foregoing and other objects are achieved according to the invention is described in detail in the following specification which sets forth an illustrative embodiment. The drawings are part of the specification wherein:

FIGURE 2 is a simplified diagram illustrating the firing mechanism;

FIGURE 2A is a schematic diagram illustrating the static balance of the firing mechanism trip lever;

FIGURE 3 is a cross-sectional view of the puncture pin and related structure;

FIGURES 4, 5 and 6 are front, side and top views, respectively, of the firing mechanism;

FIGURE 9 is a perspective view illustrating the accidental cartridge discharge preventer, and FIGURES 9A–9D are cross-sectional views illustrating the operation of the preventer;

FIGURE 10 is a perspective view illustrating the strike button and push rod assembly and FIGURE 10A is a plan view illustrating the relationship between the push rod and kicker bar;

GENERAL STRUCTURAL ARRANGEMENT

Figure 1:
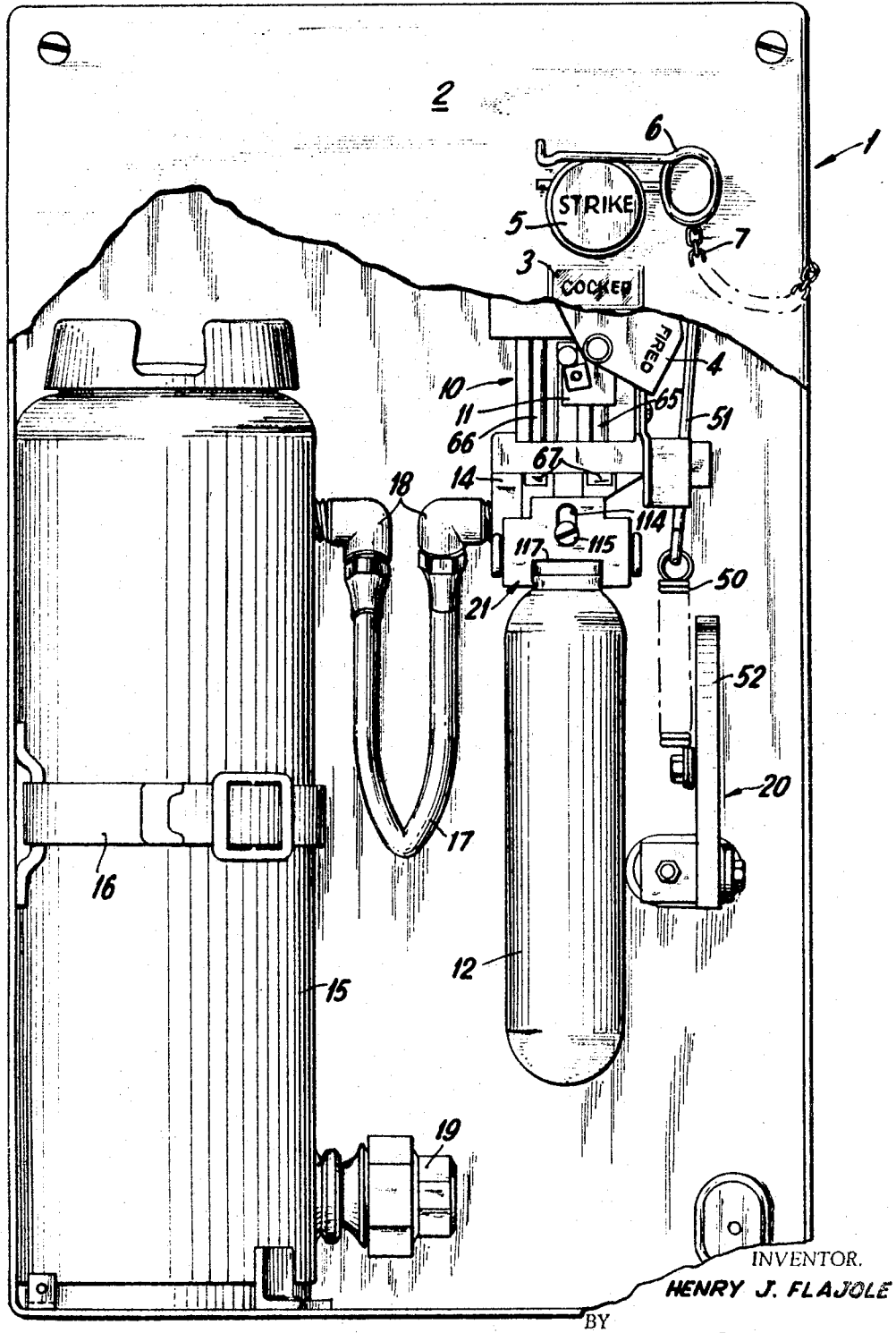
FIGURE 1 is a plan view of the control unit with portions of the cover broken away.

The assembled control unit is illustrated in FIGURE 1 enclosed in a rectangular cabinet 1 having cover 2. A window 3 is provided in the cover and cooperates with a dial plate 4 inside the enclosure. When the control unit is in the cocked condition ready for use, the portion of the dial including the word COCKED appears behind the window. When the control unit is actuated, dial 4 rotates and the word FIRED appears behind the window indicating that the control unit should be reset.

A manual strike button 5 projects through a suitable opening in the cover. A retaining ring pin 6 passes through an aperture in the strike button to prevent accidental actuation. When the retaining ring pin 6 is removed, the strike button, which is connected to the firing mechanism inside the enclosure, can be depressed to actuate the control unit. Retaining ring pin 6 is connected to the cabinet by a chain 7 to prevent loss of the pin when removed. Although not shown in FIGURE 1, the ring pin is usually secured with a lead and wire seal to prevent unauthorized tampering with the unit.

The firing mechanism 10 within the enclosure includes a hollow puncture pin (seen in FIG. 3) which is normally held in a retracted position by a trip lever 11. When the control unit is actuated, the trip lever releases the puncture pin which is forced into the mouth of a high-pressure $CO_2$ cartridge 12 to puncture the seal therein. When the seal is punctured, the fluid in the cartridge escapes through the hollow center of the puncture pin into a chamber within the cartridge receiving unit 14.

A dry chemical tank 15 filled with a dry chemical fire extinguishing agent is positioned within the enclosure by a strap 16. Tank 15 is coupled to the chamber within the cartridge receiving unit by tubing 17 and connectors 18. When the seal of cartridge 12 is punctured, the high-pressure discharge forces the dry chemical agent out of tank 15 through an exit port which is normally connected to suitable spray nozzles (not shown) through a union coupling 19. Preferably, a frangible seal is included in coupling 19 so that moisture cannot enter the tank and so that the pressure will build up in the tank prior to release of the fire extinguishing agent.

As an alternative arrangement, the chamber within cartridge receiver 14 can be pneumatically coupled to activate remotely located fire extinguishing units, either of the dry chemical or other types. This chamber can also be pneumatically coupled to actuate other devices to perform auxiliary functions such as shutting off gas valves (illustrated in FIG. 14), shutting down machinery, closing vents or fire doors, etc. Further, a microswitch (seen in FIG. 12) is coupled to firing mechanism 10 to provide an electrical signal which can control auxiliary remote functions when the unit is actuated.

Although the control unit can be manually actuated by depressing push button 5, the unit is normally set up for automatic actuation by remotely located sensor units. One such arrangement is achieved through the use of a cable release which is tripped by the separation of one or more fusible links (illustrated in FIG. 2). Tensioning mechanism 20 shown in FIGURE 1 is used to place the release cable under the appropriate tension. The control unit is also designed so that it can be actuated from electrical sensing devices such as infrared detectors, pressure or shock detectors, etc., through an actuator (shown in FIG. 13).

Thus, the control unit is highly versatile and can be used in combination with virtually any desired type of sensing system or fire extinguishing system.

A preventer 21 is coupled to cartridge receiver 14 to prevent accidental contact between the puncture pin and the seal of cartridge 12 to thereby eliminate the associated dangers. A locking bar arrangement (illustrated in FIG. 11) is used to disable the firing mechanism while the control unit is being serviced, but is so designed that the control unit cannot be put back in operation without removing the locking bar. The cocking mechanism (illustrated in FIGS. 8 and 8A) is removable so that unauthorized personnel cannot attempt to reset the control unit.

BASIC FIRING MECHANISM

The basic firing mechanism is shown in a simplified schematic representation in FIGURE 2.

The firing pin subassembly includes a firing pin 25 secured to a circular spring retainer seat 26. A lifting pin 27 passes through the spring seat and is perpendicular to the puncture pin.

A spring guide 28 includes a circular central opening dimensioned to loosely accommodate spring seat 26 which can freely move in the vertical direction (as viewed in FIG. 2). The spring guide also serves to restrict the movement of the puncture pin attached to the spring seat so that the puncture pin travels toward and away from the associated high-pressure cartridge. A mainspring 29 is located between the spring seat and a spring guide cover 30 located at the upper end of the spring guide.

Trip lever 11 includes spaced-apart plate portions (only one such plate portion being seen in FIG. 2) on opposite sides of spring guide 28, the plate portions being joined by an integral cross portion also located outside the spring guide. The trip lever is mounted for rotation about pivot pins 32 which extend from opposite sides of the spring guide. A bronze wear pad 33 is secured to the trip lever to provide a low friction retaining surface for lifting pin 27. Lifting pin 27 extends from opposite sides of the spring guide through appropriate slots and is of sufficient length to cooperate with wear pads 33.

The puncture pin subassembly can be raised, thereby compressing mainspring 29, and then latched in the retracted position as shown in FIGURE 2. In the retracted position, the lifting pin fits into a suitable recess of the trip lever and rests against wear pads 33. As will be explained later, the trip lever mechanism is statically balanced so that there is no significant tendency for the trip lever to move into or out of the latched position.

Under normal conditions, when the firing mechanism is cocked, trip lever 11 is positively held in the position shown in FIGURE 2 by means of an actuating arm 34 which is captured between a retaining bar 35 and a kicker bar 36 of a cable lever 37. The cable lever is mounted for rotation about a pivot bar 38. A trip hammer 40 is also mounted for rotation about pivot bar 38 and is resiliently coupled to cable lever 37 by means of a spring 41 and a guide pin 42 which passes through the center of spring 41.

Trip hammer 40 and cable lever 37 comprise the trigger mechanism of the release. The trigger mechanism can be actuated by a variety of different techniques, two of which are schematically illustrated in FIGURE 2, namely, the series detector release cable 44 and the remote pull cable 55.

Release cable 44 is shown including two fusible links 45 connected in series in the cable. The cable is anchored at one end, passes over a pulley 46 and is then secured at its other end to the trip hammer by means of a clamping lug 47. The tensioning mechanism 20 for the release cable 44 is shown as a simple spring in FIGURE 2, but the actual tensioning mechanism (FIG. 1) includes a spring 50 coupled to the trip hammer by a linkage 51 at one end, and to an over-center type lever 52 connected at the other end of the spring. An improved series detector arrangement is described in greater detail in copending application Ser. No. 688,041, filed Dec. 5, 1967, in the name of Flajole, et al.

When a fire is detected, one of the fusible links 45 separates to release the cable 44. As a result, tensioning mechanism 20 causes the release mechanism to rotate in the clockwise direction as indicated by the arrow in FIGURE 2. Retaining bar 35 moves up and out of the way, while kicker bar 36 simultaneously drives actuating arm 34 in a direction which causes rotation of trip lever 11 in the counterclockwise direction. Rotation of the trip lever releases the puncture pin subassembly which is then forced downwardly by mainspring 29 to puncture the seal in the associated $CO_2$ cartridge.

When one of the fusible links separates, spring 20 pulls trip hammer 40 downwardly with considerable force. Spring 41 transmits this force to cable lever 37 and also absorbs some of the impact. The end of cable lever 37 extends to a position beneath clamping lug 47 so that, in the event that spring 41 fails, the force can be transmitted from the trip hammer to the cable lever via clamping lug 47.

A remote release cable 55 is secured to the end of cable lever 37 near retainer bar 35 and passes over pulleys 57 and 58. A pull ring 59 is secured to the free end of the cable. The firing mechanism can therefore be manually actuated from a remote location by pulling on cable 55 to rotate cable lever 37 in the clockwise direction. The coupling provided by spring 41 and guide pin 42 permits rotation of the cable lever independently of trip hammer 40.

The static balance arrangement of trip lever 11 is illustrated in FIGURE 2A.

Mainspring 29 urges lifting pin 27 downwardly against wear pad 33 with a force P. The wear pad is set at an angle $\theta$ and therefore the force R acting on trip lever 11 in a direction normal to the surface of the wear pad is:

$$R = P \cos \theta \quad (1)$$

and the force F parallel to the surface is:

$$F = P \sin \theta \quad (2)$$

If rotational movement about pivot 32 is to be prevented, the moments about the pivot should be equal. Thus if $x$ and $y$, respectively, represent the moment arms for forces R and F;

$$xR = yF \quad (3)$$

The frictional holding force parallel to the wear surface should be equal to force F. This can be represented:

$$F = \mu R \quad (4)$$

where $\mu$ is the coefficient of friction between wear pad 33 and lifting pin 27. As can be seen from the geometry in FIGURE 2A:

$$\tan \theta = \frac{x}{y} \quad (5)$$

From Equations 3 and 4, it can be seen that the ratio of $x$ to $y$ is determined by the coefficient of friction and, hence:

$$\frac{x}{y} = \mu \quad (6)$$

If the materials for lifting pin 27 and wear pad 33 are selected to provide a coefficient of friction equal to 0.176, then $\theta$ can be determined:

$$\tan \theta = \frac{x}{y} = \mu = .176 \quad (7)$$

$$\theta = 10° \quad (8)$$

A ratio of .176 between $x$ and $y$ can be achieved, for example, by making:

$$x = .234 \text{ inch} \quad (9)$$

$$y = 1.33 \text{ inches} \quad (10)$$

PUNCTURE PIN AND CARTRIDGE RECEIVER ASSEMBLY

Figures 3, 6:
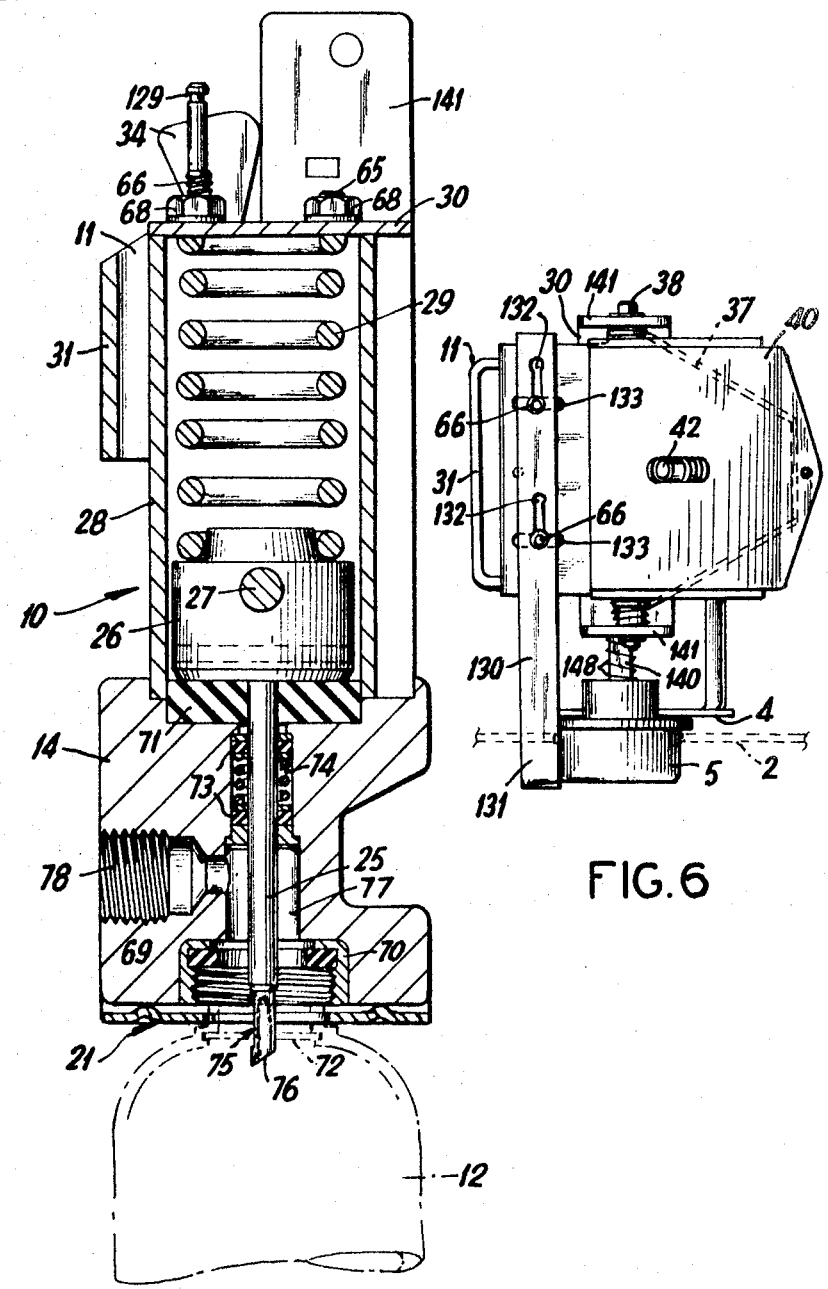

The puncture pin subassembly and related structure are illustrated in more detail in FIGURE 3.

Spring guide 28 is secured in a suitable recess in the upper surface of the cartridge receiving unit 14 by means of four studs. As can be seen in FIGURE 4, the studs 65 and 66 pass through suitable flanges of the cartridge retainer and through suitable openings in spring guide cover 30. Thus, cartridge receiving unit 14 and spring guide cover 30 are secured at opposite ends of the spring guide and are held in position between the heads 67 (seen in FIG. 4) and the associated nuts 68 (seen in FIG. 3) of the studs. A circular recess is provided in the lower surface of cartridge receiver 14 which accommodates an internally threaded fitting 70 which cooperates with the external threads surrounding the mouth of cartridge 12. An annular rubber gasket 69 is located within fitting 70 and provides a pressure-tight coupling when the cartridge is inserted.

Puncture pin 25 extends through a central opening within the cartridge receiver and through the center of fitting 70. A rubber bumper pad 71 fits in a suitable recess in the cartridge receiver unit at one end of the central opening of spring guide 28. This bumper is used to absorb the impact force when puncture pin subassembly is released and driven downwardly by spring 29 to puncture the seal 72 of cartridge 12. A sealing assembly, including rubber gaskets 73 and a compression spring 74, is located in the central opening surrounding the shank of puncture pin 25. Spring 74 squeezes the gaskets 73 so that as the gaskets spread out they provide a high-pressure seal surrounding the shank of the puncture pin.

When the puncture pin subassembly is in the extended position as shown in FIGURE 3, the puncture pin has punctured seal 72 and the end of the puncture pin is located inside cartridge 12. The high-pressure fluid within the cartridge escapes through the hollow center 76 of the puncture pin and up through the side opening 75 into chamber 77 located within the cartridge receiver. The fluid can then escape from chamber 77 through an internally threaded exit port 78 to, for example, dry chemical tank 15 via tubing 17 as previously described in FIGURE 1.

Mainspring 29 is selected to provide approximately 150 pounds of pressure for firing the puncture pin to thereby achieve a highly reliable firing action even under adverse conditions. Puncture pins, as constructed in the past, have been found unsuitable under these circumstances.

Figure 7:
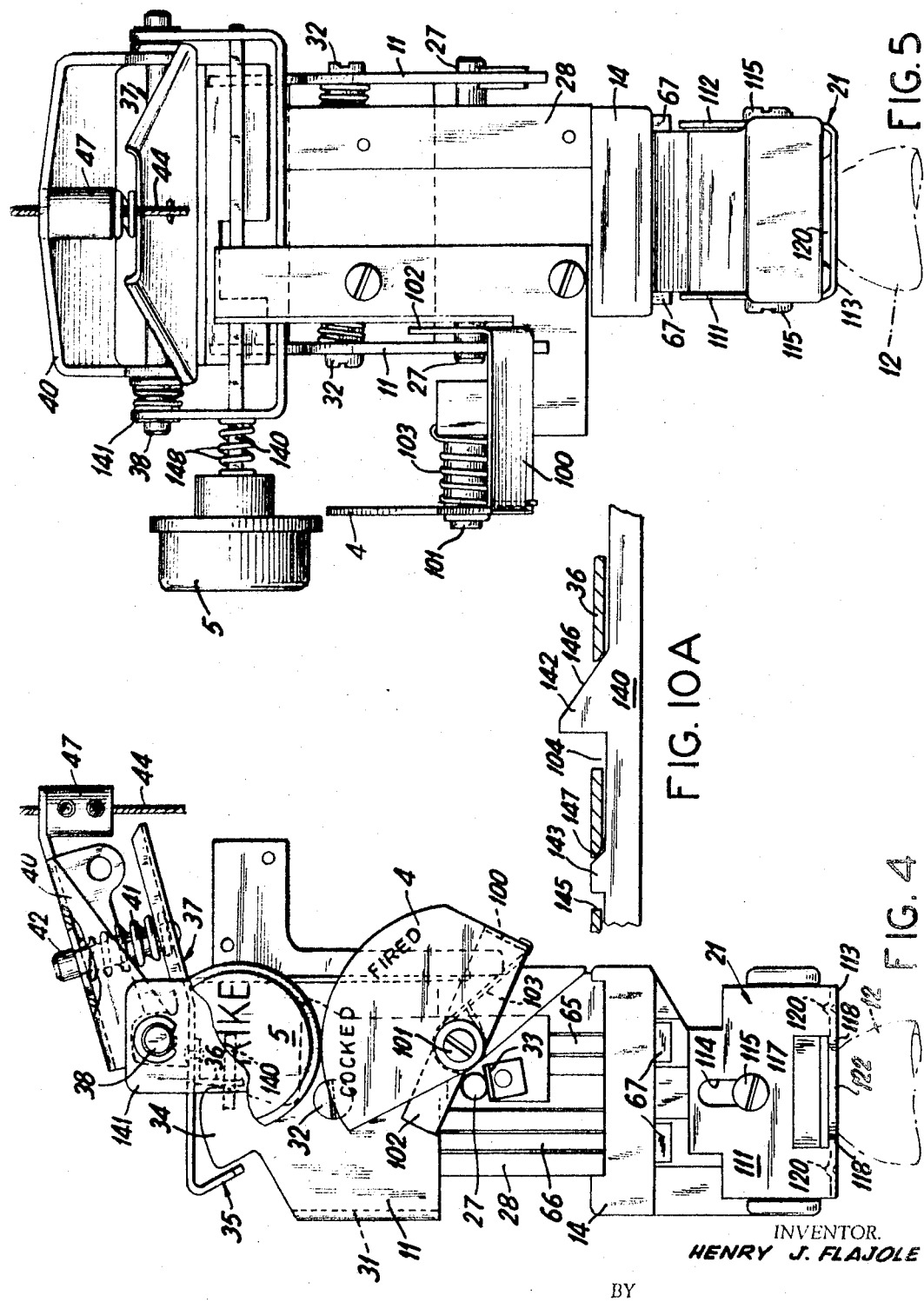
FIGURE 7A is a perspective view illustrating a prior art puncture pin structure.
FIGURES 7B and 7C illustrate improved puncture pin structures.

The prior puncture pins are as illustrated in FIGURE 7A. The puncturing end of the pin is machined to provide a reduced diameter end portion and is beveled to provide a cutting edge 81. A hole is drilled from the beveled end to provide hollow center 76. A rounded hollow 79 is provided on one side of the pin to communicate with the hollow center. It has been found that because of the high firing spring pressures used in the control unit according to this invention, there was a significant tendency of the puncture pin to buckle inwardly around hollow 79 during the puncturing operation.

A substantially improved puncture pin structure is illustrated in FIGURE 7B. Instead of employing a hollow extending across the puncture pin, a milling tool is used to mill a relatively narrow slot 80 into the side of the pin, the width of the slot being approximately equal to the diameter of the drilled hollow center. With this structure, the material remaining on the sides of slot 80 strengthens the pin to eliminate the tendency for the pin to buckle in the area of the side opening. Another improved structure is shown in FIGURE 7C where the bevel at the end of the puncture pin is reversed so that the cutting edge 82 and the opening provided by slot 80 are on diametrically opposite sides of the pin. With this latter arrangement, the major puncturing force is transmitted through the strongest portion of the puncture pin.

COCKING MECHANISM

In order to provide as much reliability as possible, it is essential that only trained, authorized personnel set up the control unit for operation. For this reason, the cocking lever 90 for the control unit, as illustrated in FIGURES 8 and 8A, is removable so that it can remain in the possession of the authorized operator.

The cocking lever includes a solid circular bar bent at right angles to provide a lever arm 91 toward one end. A U-shaped bracket 92 is rigidly secured to the bar near the other end so that the legs of the bracket form lifting arms 93 and 94. Indentations 95 and 96 are provided near the free ends of arms 93 and 94, respectively, these indentations being dimensioned to accommodate the ends of lifting pin 27. The spacing between the lifting arms is less than the length of the lifting pin, but greater than the width of trip lever 11. A fulcrum bar 97 is pivotally coupled to the portion of the lever bar located inside bracket 92. The fulcrum bar is provided with a recess 98 extending from the free edge, this recess being dimensioned so that the fulcrum bar can be located upon a shoulder 99 of the cartridge receiving unit. When positioned as shown in FIGURE 8, it should be noted that the fulcrum bar leans away from the spring guide and, therefore, the downward forces exerted upon the fulcrum point as the system is cocked tend to drive the fulcrum bar into the corner formed by shoulder 99 and spring guide 28. Thus, the corner position is fixed at one end of the fulcrum bar, the distance from the corner to the fulcrum point is also fixed, and the distance from the fulcrum point to the lifting pin 27 is likewise fixed. Thus a stable triangular configuration exists and, therefore, the lifting pin can be raised by rotating the cocking lever about the fulcrum point. The position of the fulcrum point changes as the lifting pin rises, but the stable triangular configuration exists throughout the cocking operation.

Figure 8:
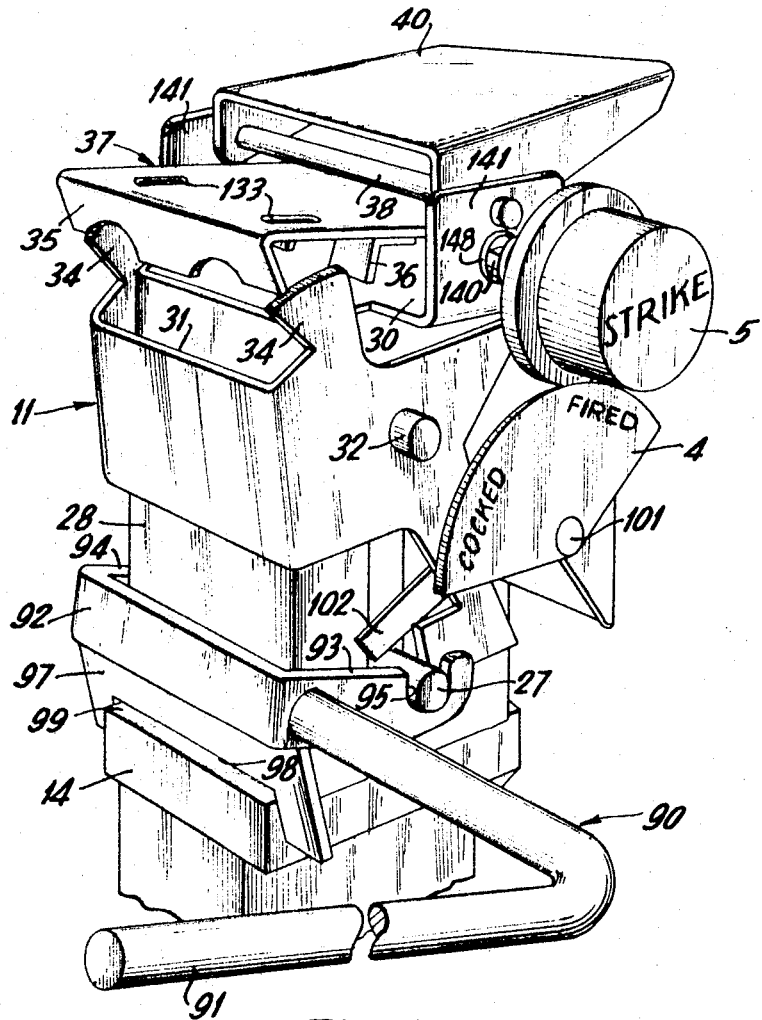
FIGURE 8 is a perspective view of the firing mechanism and cocking handle.
Figure 8A:
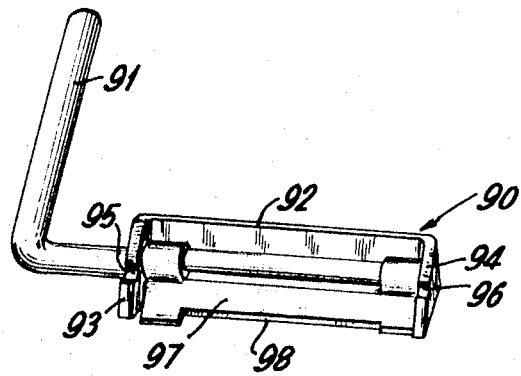
FIGURE 8A is a perspective view of the cocking handle removed from the firing mechanism.

The firing mechanism is shown in the fired condition in FIGURE 8, i.e., with the puncture pin subassembly in the extended position. Rotation of cocking lever 91 raises the lifting pin to the retracted position where the lifting pin is latched by trip lever 11.

Dial plate 4 is mounted for rotation about a pivot 101. An extension 100 of the dial plate is bent at right angles to form a follower arm 102 which rests upon lifting pin 27. The follower arm is urged toward the lifting pin by means of a coil spring 103. Thus, when the control unit is in the fired condition, as shown in FIGURE 8, dial plate 4 is in the position shown so that the word FIRED appears behind window 3 shown in FIGURE 1. As the system is cocked and lifting pin 27 rises, dial plate 4 is rotated in the clockwise direction to a position where the word COCKED appears behind window 3.

ACCIDENTAL CARTRIDGE DISCHARGE PREVENTER

The $CO_2$ cartridge 12 used to actuate the fire extinguishing system, or to perform auxiliary functions, is pressurized at approximately 800 p.s.i. If the seal of the cartridge is accidentally broken, the cartridge becomes a jet propelled projectile and, because of the high-pressures involved, is extremely dangerous. A safety preventer 21 is secured to the cartridge receiver unit to prevent accidental contact between the puncture pin and the seal of the cartridge to thereby eliminate the possibility of an accidental discharge while replacing cartridges.

Preventer 21 is a generally U-shaped bracket including the space-apart leg portions 111 and 112, and a cross member 113. Elongated slots 114 are provided in each of the leg portions, these slots extending in a direction perpendicular to the cros member. The leg portions are spaced-apart by a distance slightly greater than the width of cartridge receiver 14 and are secured to the cartridge receiver by screws 115 which pass through the slots 114. Suitable spacers are located in the slots surrounding the threaded portions of screws 115 so that a sliding coupling is provided between the preventer and the cartridge receiver which permits the preventer to move toward and away from the cartridge receiver. Slots 114 provide a stop which limits the maximum distance of preventer 21 away from the cartridge receiver unit. The cross member 113 is deformed to provide a pair of elongated dimples 120 which project rearwardly, i.e., toward the cartridge receiver unit. These dimple projections provide a stop which limits the travel of the preventer in the direction toward the cartridge receiver and thereby establishes the minimum separation distance between cross member 113 and the adjacent end of the cartridge receiver.

Cross member 113 is provided with an elongated opening 116 extending from one edge, and leg portion 11 is provided with an adjacent rectangular opening 117. The width of the opening 116 is somewhat less than the width of opening 117, thereby providing parallel spaced-apart projections 118 along the opposed parallel edges of opening 116.

The high-pressure cartridge includes an externally threaded mouth portion 121 adapted to cooperate with the internal threaded portion of fitting 70 in the end of the cartridge receiver. The seal 72 of the cartridge is recessed within the mouth portion. An annular groove 122 surrounds the neck of the cartridge. The parallel projections 118 are adapted to cooperate with annular groove 122, that is, the spacing between the parallel edges of projections 118 is approximately equal to the diameter at the base of groove 122.

In order to replace a cartridge, the firing mechanism must be in the cocked condition so that the firing pin 25 is retracted and does not extend beyond the end of the cartridge receiver. With the puncture pin retracted, a new cartridge can easily be inserted by first moving the cartridge laterally of the cartridge receiver so that groove 122 slides into position between projections 118. The threaded mouth portion of the cartridge is then aligned with the internally threaded opening of the cartridge receiver as is shown in FIGURE 9A. The cartridge is then screwed into position as shown in FIGURE 9B, the sliding coupling provided by groove 114 being designed to permit the necessary linear movement of the cartridge toward the cartridge receiver. When the firing mechanism is actuated, the puncture pin is forced toward its extended position and punctures the recessed seal 72 as illustrated in FIGURE 9B.

The spent cartridge cannot be removed while the puncture pin is in the extended position. As illustrated in FIGURE 9C, even if the cartridge is unthreaded and pulled away from the cartridge receiver to the maximum distance permitted by preventer 21, the extended puncture pin is still located within the mouth of the cartridge and thereby provides an obstruction which prevents the lateral movement necessary for removing the cartridge from the preventer. Insertion of a new cartridge while the puncture pin is extended is likewise prevented. This could occur during initial installation, or where the firing mechanism is actuated after removal of a spent cartridge. However, when the puncture pin is in the extended position, it still provides an obstruction so that it becomes impossible to laterally move the new cartridge into the aligned position required for screwing the cartridge into the cartridge receiver. Thus, the extended puncture pin always provides an obstruction which prevents removal of a spent cartridge or insertion of a new cartridge. A cartridge can be removed, or replaced, only while the control unit is in the cocked condition with the puncture pin retracted.

There is one other possibility of accidental discharge which must be protected against. This could occur when the operator does not attempt to first insert the cartridge in the preventer, but, instead, attempts to directly insert the cartridge into the cartidge receiver. If the puncture pin is in the extended position, there is a danger that it may accidentally come into contact with the cartridge seal. However, as previously mentioned, elongated dimples 120 act as a stop to limit the minimum separation between projections 118 and the cartridge receiving unit. As illustrated in FIGURE 9D, when the cartridge is placed against the projections 118, a safety distance exists between the end of the puncture pin and the recessed seal 72 within the cartridge. The possibility of an accidental discharge is therefore eliminated.

LOCKING ARRANGEMENT

As a safety feature to protect the maintenance personnel, it is desirable to include a locking mechanism which prevents accidental actuation of the firing mechanism while the unit is being serviced. However, such a locking arrangement, if not properly designed, can create a severe problem, since it is then possible that the system can be left in the locked condition and therefore inoperable during a fire, or other disaster. The locking arrangement, according to the invention, is best seen in FIGURES 3, 6 and 11, and principally includes the locking bar 130.

As previously described in connection with FIGURE 3, studs 65 and 66 secure spring guide cover 30 and cartridge receiver 14 to opposite ends of spring guide 28. Studs 65 terminate just beyond their associated nuts 68, but studs 66 extend beyond the nuts. An annular groove 129 is provided near the ends of studs 66, these grooves being located a short distance beyond the outer edges of actuating arms 34 of the trip lever.

Locking bar 130 is a flat metal bar bent somewhat at its center. One end of the locking bar is shaped to provide a handle 131 and a pair of keyhole-shaped apertures 132 are provided toward the other end. The spacing between the keyhole-shaped apertures corresponds to the spacing between studs 66.

Figure 11:
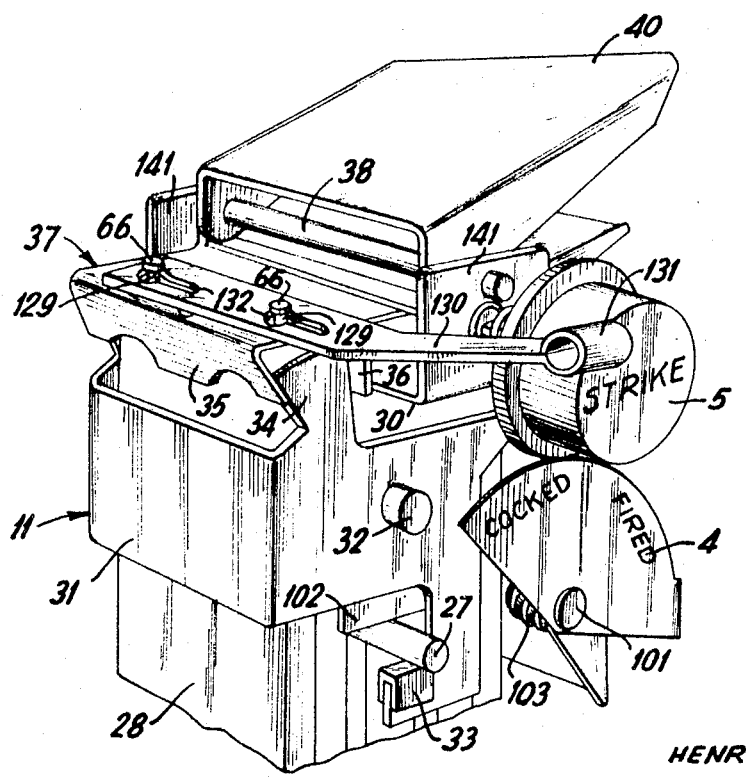
FIGURE 11 is a perspective view of the firing mechanism with the locking bar installed.

As can be seen in FIGURE 11, the cable release lever 37 fits over the end of actuating arms 34 and captures the actuating arms between retainer bar 35 and kicker bar 36 when the firing mechanism is in the cocked condition. Studs 66 extend upwardly through slots 133 in cable lever 37. Locking bar 130 is inserted by dropping the circular portion of the keyhole-shaped apertures over the ends of studs and by then pushing the locking bar so that the elongated portions of the keyhole-shaped apertures fit into the annular grooves 129 of the studs. When the system is locked, the locking bar is positioned as shown in FIGURE 6. When the locking bar is inserted, it is impossible for the cable release lever 37 to rotate and, hence, the control unit cannot be fired.

When the cover 2 of the control unit is closed, it occupies a position indicated by the dotted lines in FIGURE 6. The handle 131 of locking bar 130 projects beyond the cover position so that the cover cannot be closed while the locking bar is present. In this manner the operator is automatically reminded to remove the locking bar and, therefore, the possibility of an operator leaving the system in the locked condition is substantially eliminated.

ACTUATING MECHANISMS

Figure 10:
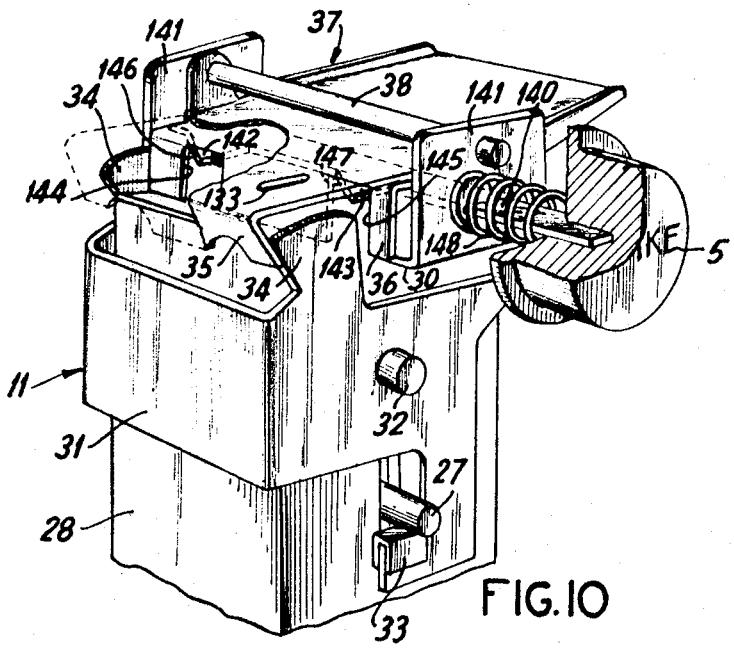

One of the actuating mechanisms for the control unit involves the manual strike button 5 previously referred to in connection with FIGURE 1, but shown in more detail in FIGURES 10 and 10A.

Strike button 5 is secured to the end of a rectangular push rod 140. Spring guide cover 30 includes upwardly extending supports 141 provided with rectangular openings which accommodate push rod 140. Supports 141 also include circular apertures which accommodate pivot rod 38 about which cable release lever 37 and trip hammer 40 pivot.

Push rod 140 includes a pair of generally triangular cam projections 142 and 143 extending from one side of the push rod. These triangular projections extend through cooperating rectangular openings 144 and 145, respectively, in kicker bar 36. The slanting edges 146 and 147 of the triangular projections engage the edges of the rectangular openings in the kicker bar to thereby provide a cam surface which forces the kicker bar away from the push rod when strike button 5 is depressed. Therefore, as the strike button is depressed, cable release lever 37 rotates in a clockwise direction about pivot bar 38 which in turn causes trip lever 11 to rotate counterclockwise and release lifting pin 27. A spring 148 returns the strike button to its manual position.

Two other actuating mechanisms have been previously described in connection with FIGURE 2. One of these mechanisms includes the series fusible link release cable 55 and the other mechanism includes the remote pull cable 55.

Figure 13:
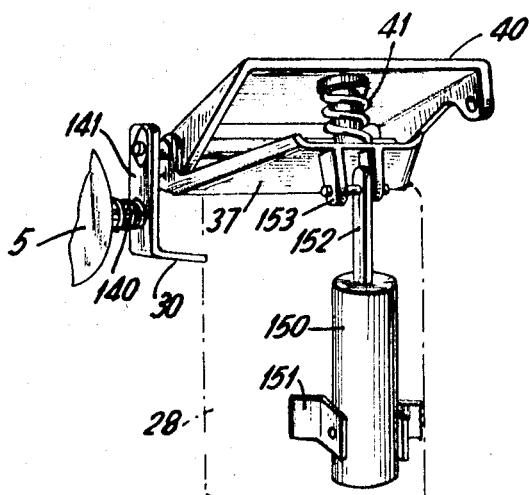
FIGURE 13 is a partial perspective view illustrating an actuator coupled to the firing mechanism.

Another release mechanism is illustrated in FIGURE 13 and includes an actuator 150 pivotally secured to spring guide 28 by means of a suitable bracket 151. The movable rod 152 of the actuator is coupled to release lever 37 by means of a clevis arrangement 156. The actuator can be either an electromagnetic solenoid, or a pneumatic or hydraulic cylinder, either of which can be arranged to pull rod 152 downwardly when actuated to thereby rotate lever 37 in the clockwise direction to in turn fire the control unit.

The control unit, according to the invention, is completely versatile, since it can be actuated manually, through cable arrangements, or through electric, pneumatic, or hydraulic actuators.

CONTROLLED SYSTEMS

The control unit is also completely versatile in the system control that can be achieved.

As was previously described in connection with FIGURE 1, the control unit can be used to directly activate an adacent dry chemical extinguisher by using the cartridge discharge to directly force the fire extinguishing agent out of the dry chemical tank. The dry chemical tank can be located adjacent the fire mechanism, or can be located remotely if desired. Where the system includes a plurality of fire extinguishers, these can be coupled to the same control unit either through a suitable manifold arrangement, or where higher pressures are required, through slave control units. With the latter arrangement, the slave control units could each be of the type including a pneumatic actuator (as illustrated in FIG. 13) with each of the pneumatic actuators coupled to exit ports 78 (FIG. 3) of the master control unit. Sprinkler-type fire extinguishers, $CO_2$-type fire extinguishers, Freon-type fire extinguishers or foam-type fire extinguishers can all be arranged for pneumatic actuation and, thus, can be controlled from the cartridge discharge of the master control unit.

Figure 14A:
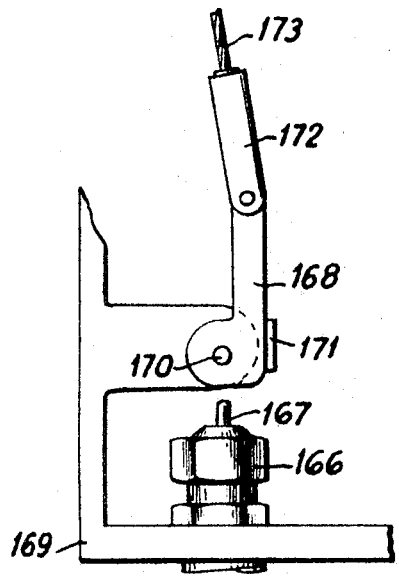
FIGURES 14 and 14A are diagrams illustrating a pneumatic valve shutoff arrangement.
Figure 14:
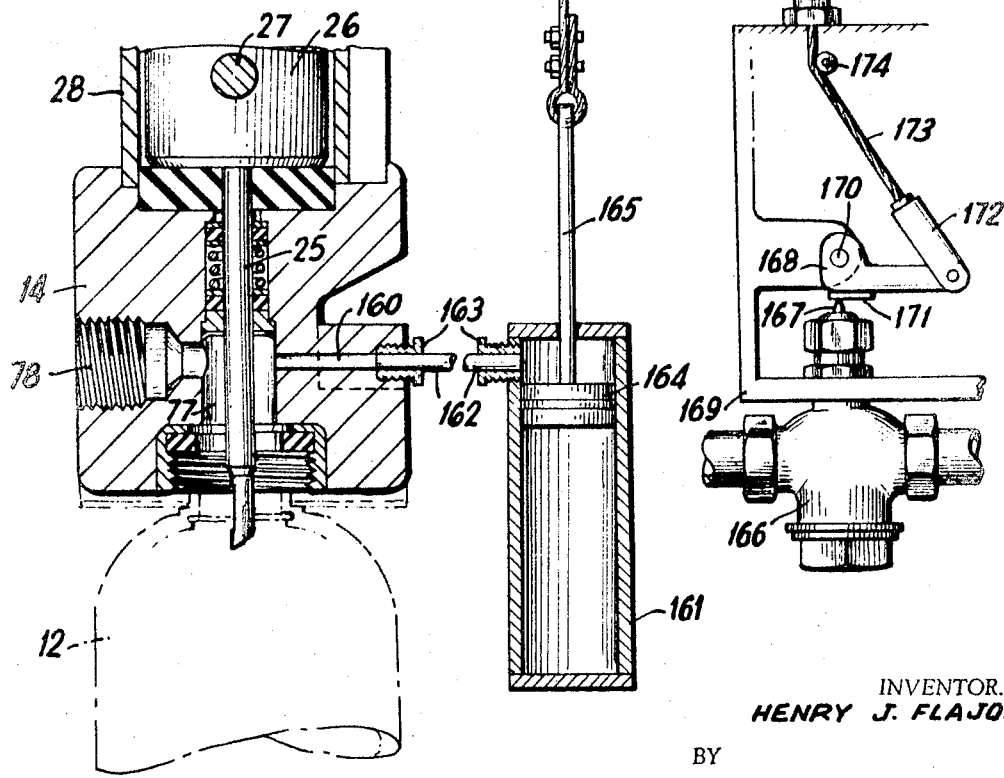

The control unit, according to the invention, can also be used to control auxiliary functions such as shutting off gas valves and the like. An arrangement for accomplishing a valve shutoff function is illustrated in FIGURE 14.

Cartridge receiver 14 is modified to provide a second exit port 160 from chamber 77, this second exit port being coupled to a pneumatic cylinder 161 through tubing 162 and connectors 163. The pneumatic cylinder includes a piston 164 connected to a connecting rod 165.

The shutoff valve 166 is of the spring-loaded, normally-closed type which can be opened by depressing its valve stem 167. Cam lever 168 is supported above the valve stem by a suitable support structure 169 which supports the pivot 170 for the cam lever. The cam surface of cam lever 168 is eccentric relative to the pivot. When the cam lever is in the position shown in FIGURE 14, valve stem 167 rests against a wear plate shim 171 secured to the cam lever and, therefore, the valve is held in the open condition. The force provided by the spring-loaded valve stem 167 is directed toward pivot 170 and, therefore, cannot rotate the pivot arm.

A cable connector 172 is coupled to the end of lever 168 and is attached to one end of a cable 173. Cable 173 passes around pulleys 174 and is then attached to connecting rod 165 at its other end.

When the control unit is actuated, puncture pin 25 punctures the seal of cartridge 12 and the cartridge discharge passes into cylinder 161 forcing piston 164 downwardly. This creates a pull on cable 173 and, therefore, cam lever 168 rotates to the position shown in FIGURE 14A. Because of the eccentricity of the cam surface of the lever 168, valve stem 167 is released and the valve returns to its normally closed condition.

In an alternate arrangement, valve 166 could be the main control valve for a water sprinkler type fire extinguisher system. With this arrangement, valve 166 would be of the spring-loaded, normally-open type and the cam lever arrangement would maintain the valve in the closed condition while not in use.

Figure 12:
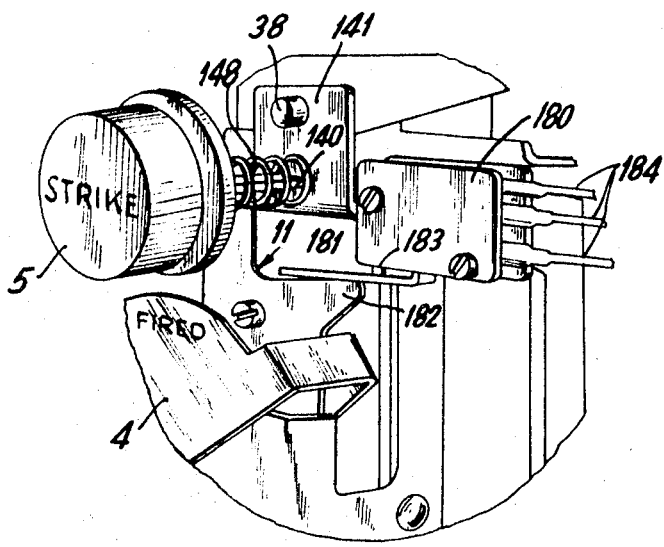
FIGURE 12 is a partial perspective view illustrating the microswitch assembly.

The control unit, according to the invention, is further provided with a microswitch 180 as illustrated in FIGURE 12. The microswitch includes an actuating lever 181 which is positioned to cooperate with projection 182 of trip lever 11. Actuating lever 181 is arranged to depress an actuating pin 183 of the microswitch.

When the control unit is fired, trip lever 11 rotates in a counterclockwise direction as indicated by the arrow thereby moving actuating lever 181 upwardly to depress switch actuator 183. Leads 184 from switch 180 can be electrically connected to control auxiliary functions such as the closing of vents and fire doors, the shutdown electrical equipment, the shutoff of fuel lines, etc.

Thus, it is seen that the same control unit can be used to activate a variety of fire extinguishing systems in either single and multiple extinguishing systems. In addition, the control unit can control auxiliary functions either by means of pneumatic, or electrical connections.

CONCLUSION

While only a few illustrative embodiments of the control unit, and uses thereof, have been specifically described, it should be obvious to those skilled in the art that there are numerous variations of the structural arrangement within the scope of the invention and numerous uses other than those specifically illustrated.

The invention is more particularly defined in the appended claims.

I claim:

1. In a control unit for fire extinguishing systems and the like activated by the puncturing of the seal in a high-pressure cartridge, an improved cartridge puncturing mechanism comprising:

a cartridge receiver for holding the cartridge;

a puncture pin for puncturing the seal of said cartridge and permitting escape of fluid from said cartridge through said puncture pin;

guide means for restricting the travel of said puncture pin toward and away from the seal of said cartridge;

resilient means for urging said puncture pin toward said seal;

a rotating trip lever mechanism for normally retaining said puncture pin in a retracted position, but being capable, upon rotation, of releasing said puncture pin, said trip lever including an actuating arm extending therefrom; and a release mechanism for normally holding said actuating arm to prevent rotation of said trip lever mechanism in either direction, said release mechanism being operative, upon actuation, to simultaneously release the hold on said actuating arm and to positively drive said actuating arm to rotate said trip lever mechanism toward a puncture pin releasing position.

2. The control unit according to claim 1 wherein said trip lever mechanism is statically balanced to eliminate the tendency of trip lever mechanism rotation as a result of the puncture pin retaining force.

3. The control unit according to claim 1 wherein said release mechanism includes a retainer bar and a kicker bar spaced to normally capture said actuating arm to thereby prevent rotation of said trip lever, said release mechanism being operative, when actuated, to simultaneously move said retainer bar away and drive said actuating arm via said kicker bar to rotate said trip lever mechanism to said puncture pin releasing position.

4. The control unit according to claim 1 wherein said release mechanism includes a lever assembly coupled to said actuating arm, a trip hammer, and means resiliently coupling said trip hammer to said lever assembly while permitting independent movement of said lever assembly.

5. The control unit according to claim 1 further comprising an electrical switch mechanically coupled to said trip lever mechanism for actuation upon rotation of said trip lever mechanism to said puncture pin releasing position.

6. The control unit according to claim 1 further comprising an actuator for actuating said release mechanism.

7. The control unit according to claim 6 wherein said actuator is an electromagnetic solenoid.

8. The control unit according to claim 6 wherein said actuator includes a moving piston.

9. The control unit according to claim 1 further including means damping the movement of said puncture pin upon release by said strip lever mechanism.

10. In a control unit for fire extinguishing systems and the like, which is enclosed in a cabinet and activated by the puncturing of the seal in a high-pressure cartridge, the combination comprising:

a high-pressure cartridge;

a cartridge receiver for holding said cartridge;

a puncture pin for puncturing the seal of said cartridge and permitting escape of fluid from said cartridge through said puncture pin;

guide means for restricting the travel of said puncture pin toward and away from the seal of said cartridge;

resilient means for urging said puncture pin toward said seal;

a rotating trip lever mechanism for normally retaining said puncture pin in a retracted position, but being capable, upon rotation, of releasing said puncture pin, said trip lever including an actuating arm extending therefrom;

a release lever mechanism for normally holding said actuating arm to prevent rotation of said trip lever mechanism in either direction, said actuating lever mechanism being operative, upon actuation, to simultaneously release the hold on said actuating arm and to positively drive said actuating arm to rotate said trip lever mechanism toward a puncture pin releasing position; and a locking bar which, when inserted, holds said actuating lever mechanism in the normal condition to thereby hold said actuating arm and prevent accidental actuation of the puncturing mechanism, said locking bar being so dimensioned that, when inserted, it extends sufficiently to prevent closing of the cabinet enclosing the control unit.

11. A control unit according to claim 10 wherein said actuating lever mechanism rotates about a pivot and said locking bar, when inserted, prevents rotation of the same.

12. In a control unit for fire extinguishing systems and the like, activated by the puncturing of a seal in a high-pressure cartridge, an improved cartridge puncturing and cocking mechanism comprising:

a high-pressure cartridge;

a cartridge receiver for holding said cartridge;

a puncture pin for puncturing the seal of said cartridge and permitting escape of fluid from said cartridge through said puncture pin, said puncture pin being secured to a lifting pin;

a trip lever mechanism operable to engage said lifting pin and normally retain said puncture pin in a retracted position, but being capable, upon activation, of releasing said puncture pin to permit puncturing of said seal; and a removable cocking mechanism including
means adapted to engage said cartridge receiver and provide a fulcrum spaced therefrom, and
a cocking lever pivotally connected at said fulcrum and adapted, at one end, to engage said lifting pin so that rotation of said lever about said fulcrum moves said puncture pin to said retracted position where said puncture pin is retained by said trip lever mechanism.

13. In a control unit for fire extinguishing systems and the like activated by the puncturing of the seal in a high-pressure cartridge, an improved cartridge puncturing mechanism comprising:

a cartridge receiver for holding the cartridge;

a hollow cylindrical puncture pin cut diagonally at one end to provide a cutting edge for puncturing the seal of said cartridge and including a longitudinally extending slot therein removed from said cutting edge and having a width approximately equal to the diameter of the central opening in said cylindrical pin, guide means for restricting the travel of said puncture pin toward and away from the seal of said cartridge;

resilient means for urging said puncture pin toward said seal; and a trip lever mechanism for normally retaining said puncture pin in a retracted position, but being capable, upon actuation, of releasing said puncture pin to puncture the seal of said cartridge.

14. The control unit according to claim 13 wherein said cutting edge and said slot are located on the same side of said puncture pin.

15. The control unit according to claim 13 wherein said cutting edge and said slot are located on opposite sides of said puncture pin.

16. In a control unit for fire extinguishing systems and the like, the combination of
    a high-pressure cartridge including
        a threaded mouth portion;
        a recessed seal within said mouth portion, and
        an annular groove surrounding the neck portion of the cartridge adjacent said mouth portion;
    a cartridge receiver including a threaded opening for receiving said threaded mouth portion of said cartridge;
    a puncture pin for puncturing the seal of said cartridge and permitting escape of fluid from said cartridge through said puncture pin;
    guide means for restricting the travel of said puncture pin toward and away from the seal of said cartridge;
    resilient means for urging said puncture pin toward said seal;
    a trip lever mechanism operable to engage and normally retain said puncture pin in a retracted position, but being capable, upon actuation, of releasing said puncture pin for movement to an extended position;
    a safety preventer for preventing accidental discharge of said cartridge including a pair of spaced-apart projections adapted for cooperation with said annular groove of said cartridge and permitting lateral movement of said cartridge into an aligned position relative to said threaded opening of said cartridge receiver; and
    means slidably coupling said preventer to said cartridge receiver including
        guide means permitting movement of said safety preventer whereby an aligned cartridge can move into said threaded opening of said cartridge receiver, and
        first stop means for limiting movement of said preventer away from said cartridge receiver so that said puncture pin, when in said extended position, obstructs said lateral movement of said cartridge relative to said preventer.

17. The control unit according to claim 16 wherein said safety preventer includes second stop means which limit the maximum extension of said puncture pin beyond said preventer to a distance less than that from the outer edge of said mouth to said recessed seal in said cartridge.

18. In a control unit for fire extinguishing systems and the like, the combination of
    a high-pressure cartridge including a seal therein;
    a cartridge receiver for holding said cartridge and including a chamber therein;
    a hollow puncture pin for puncturing the seal of said cartridge and permitting escape of fluid from said cartridge through the hollow center of said puncture pin into said chamber;
    guide means for restricting the travel of said puncture pin toward and away from the seal of said cartridge;
    resilient means for urging said puncture pin toward said seal;
    a trip lever mechanism for normally retaining said puncture pin in a retracted position, but being capable, upon actuation, of releasing said puncture pin to puncture the seal of said cartridge;
    a fire extinguishing system; and
    means coupling said fire extinguishing system to said chamber for actuating said fire extinguishing system when said seal is punctured.

19. The control unit according to claim 18 further including a pneumatic piston and means coupling said piston to said chamber.

References Cited

UNITED STATES PATENTS

| | | | |
|---|---|---|---|
| 2,755,865 | 7/1956 | Jacobs | 169—9 |
| 2,819,764 | 1/1958 | Anthony | 169—9 |
| 3,105,458 | 10/1963 | Downham | 169—31 |
| 3,228,474 | 1/1966 | Huthsing | 169—9 |

FOREIGN PATENTS 729,313  4/1932  France.

EVERETT W. KIRBY, Primary Examiner

U.S. Cl. X.R.
169—31; 239—309